(12) United States Patent
Januszkiewicz et al.

(10) Patent No.: US 9,180,506 B2
(45) Date of Patent: Nov. 10, 2015

(54) MANUFACTURING METHODS AND APPARATUS FOR TARGETED COOLING IN HOT METAL ROLLING

(71) Applicant: Novelis Inc., Atlanta, GA (US)

(72) Inventors: Krzysztof Ryszard Januszkiewicz, Inverary (CA); Timothy Francis Stanistreet, Kennesaw, GA (US)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 14/201,303

(22) Filed: Mar. 7, 2014

(65) Prior Publication Data

US 2014/0260483 A1 Sep. 18, 2014

Related U.S. Application Data

(60) Provisional application No. 61/798,603, filed on Mar. 15, 2013.

(51) Int. Cl.
*B21B 27/10* (2006.01)
*B21B 37/74* (2006.01)
(Continued)

(52) U.S. Cl.
CPC . *B21B 37/74* (2013.01); *B21B 1/26* (2013.01); *B21B 27/10* (2013.01);
(Continued)

(58) Field of Classification Search
CPC .......... B21B 1/26; B21B 27/10; B21B 37/74; B21B 45/0293; B21B 45/029; B21B 45/0218; B21B 45/0251; B21B 2027/103; B21B 2003/001; B21B 45/0203; B21B 45/0206
USPC ................. 72/41–45, 201, 200, 202; 165/101
See application file for complete search history.

(56) References Cited

U.S. PATENT DOCUMENTS 3,465,564 A * 9/1969 Cole et al. ........................ 72/201
3,881,337 A 5/1975 Cofer
(Continued)

FOREIGN PATENT DOCUMENTS

CN 1216700 8/2005
CN 100547104 10/2009
(Continued)

OTHER PUBLICATIONS

Evertz Group, "Roll Cooling Systems/selective cooling," http://www.evertz-group.com/en/companies/evertz-hydrotechnik/products/roll-cooling-systems/, Believed to be published at least as early as Mar. 7, 2007.

(Continued)

*Primary Examiner* — Peter DungBa Vo
*Assistant Examiner* — Joshua D Anderson
(74) *Attorney, Agent, or Firm* — Kilpatrick Townsend & Stockton LLP (57) ABSTRACT

A rolling mill apparatus and methods of hot rolling with targeted cooling. In one aspect, a mill having multiple roller stacks includes a cooling system that directs the bulk coolant flow to a heat exchanger having first and second heat exchangers in parallel. The first heat exchanger is adapted to cool the heated coolant to a first temperature for use in a first coolant stream discharged through a first set of nozzles during rolling, while the second heat exchanger is adapted to cool heated coolant to a lower temperature for use in a second coolant stream at a second temperature lower than the first for discharge through a second set of nozzles downstream to facilitate rolling or coiling of the rolled metal.

23 Claims, 11 Drawing Sheets

(51) Int. Cl.
 B21B 1/26 (2006.01)
 B21B 45/02 (2006.01)
 *B21B 3/00* (2006.01)

(52) U.S. Cl.
 CPC ........ *B21B 45/0206* (2013.01); *B21B 45/0218* (2013.01); *B21B 45/0293* (2013.01); *B21B 45/0203* (2013.01); *B21B 2003/001* (2013.01); *B21B 2027/103* (2013.01)

(56) References Cited

U.S. PATENT DOCUMENTS

| | | | |
|---|---|---|---|
| 4,415,377 A * | 11/1983 | Pryor et al. | 148/609 |
| 4,467,629 A * | 8/1984 | Schimion | 72/11.7 |
| 4,612,788 A | 9/1986 | Kitagawa | |
| 5,212,975 A | 5/1993 | Ginzburg | |
| 5,701,775 A | 12/1997 | Sivilotti et al. | |
| 5,799,523 A * | 9/1998 | Seidel et al. | 72/9.3 |
| 7,210,522 B2 * | 5/2007 | Gruian | 165/202 |
| 7,434,435 B2 | 10/2008 | Richter et al. | |
| 8,047,035 B2 * | 11/2011 | Takahama et al. | 72/41 |
| 2011/0308288 A1 | 12/2011 | Mcrae et al. | |

FOREIGN PATENT DOCUMENTS

| | | |
|---|---|---|
| JP | 09122733 A | 5/1997 |
| JP | 2000015322 A | 1/2000 |
| JP | 2007253178 A | 10/2007 |
| JP | 2009195961 A | 9/2009 |
| JP | 2013123732 | 6/2013 |
| JP | 2013123734 | 6/2013 |
| WO | 8809230 | 12/1988 |
| WO | 2013053507 | 4/2013 |

OTHER PUBLICATIONS

International Patent Application No. PCT/US2014/021748, International Search Report and Written Opinion mailed Jun. 12, 2014, 11 pages.

* cited by examiner

MANUFACTURING METHODS AND APPARATUS FOR TARGETED COOLING IN HOT METAL ROLLING

The present application claims the benefit of U.S. Provisional Patent Application Ser. No. 61/798,603 filed Mar. 15, 2013, which is hereby incorporated by reference in its entirety.

FIELD OF THE INVENTION

The present invention relates to manufacturing methods and apparatuses for hot rolling sheet metal. In particular, the invention provides manufacturing methods and apparatuses having enhanced cooling for reducing rolling times and increasing throughput and efficiency in rolling sheet metals, such as aluminum.

SUMMARY

Embodiments of the present invention relate to improved manufacturing methods and apparatuses for rolling of sheet metal. In particular, aspects of the invention provide a rolling mill apparatus having enhanced targeted cooling to maximize rolling and/or coiling speed and overall throughput. The invention is particularly useful in cooling and lubrication of sheet aluminum hot roll in a rolling and coiling mill having multiple roll stands.

In certain aspects, the present invention includes a coolant system that cools the rolled sheet metal during rolling with coolant fluid at a first temperature at or above 50° C. and concurrently cools the rolled sheet metal at a different location with coolant fluid at a second temperature below 50° C. to facilitate rolling at a desired rolling temperature. The coolant fluid at a first temperature may also be used on the metal entry side of the roll stands to provide lubrication to the rolls. In certain embodiments, the second temperature is about 5 to 15° C. lower than the first temperature. This feature allows the cooling system to retain advantages associated with coolant discharge at temperatures of 50° C. or above during the rolling process, while a coolant flow below 50° C. provides additional cooling at select location(s) to increase rolling or coiling speed and improve efficiency. The separate coolant flows can be generated from a single coolant supply collected from the discharged coolant using a heat exchanger system composed of several heat exchangers, such as a heat exchanger having a first and second heat exchanger, the first heat exchanger cooling a first portion of the heated discharged coolant fluid to about the first temperature, while the second heat exchanger cools a second portion of the heated discharged coolant fluid to a lower temperature suitable for use in the lower temperature coolant stream at a second temperature lower than the first. The first and second heat exchangers can appear in the system designs as first and second groups of heat exchangers as required by cooling efficiency, plant space and operation reliability.

In certain embodiments, existing stand-by heat exchangers can be utilized as the second heat exchanger. In this case, the design cooling system may include a piping system and one or more valves that direct bulk coolant flow through the second heat exchanger, if the first heat exchanger is serviced. The piping system may further include piping and one or more valves to control flow of a second portion of the coolant to a desired set of nozzles for targeted cooling at select roll stands or strip surfaces.

DETAILED DESCRIPTION

The invention relates to hot rolling metal, particularly hot rolling of aluminum with a rolling mill having multiple stands and targeted cooling of the rolled metal at select locations, as described herein.

Figure 1:
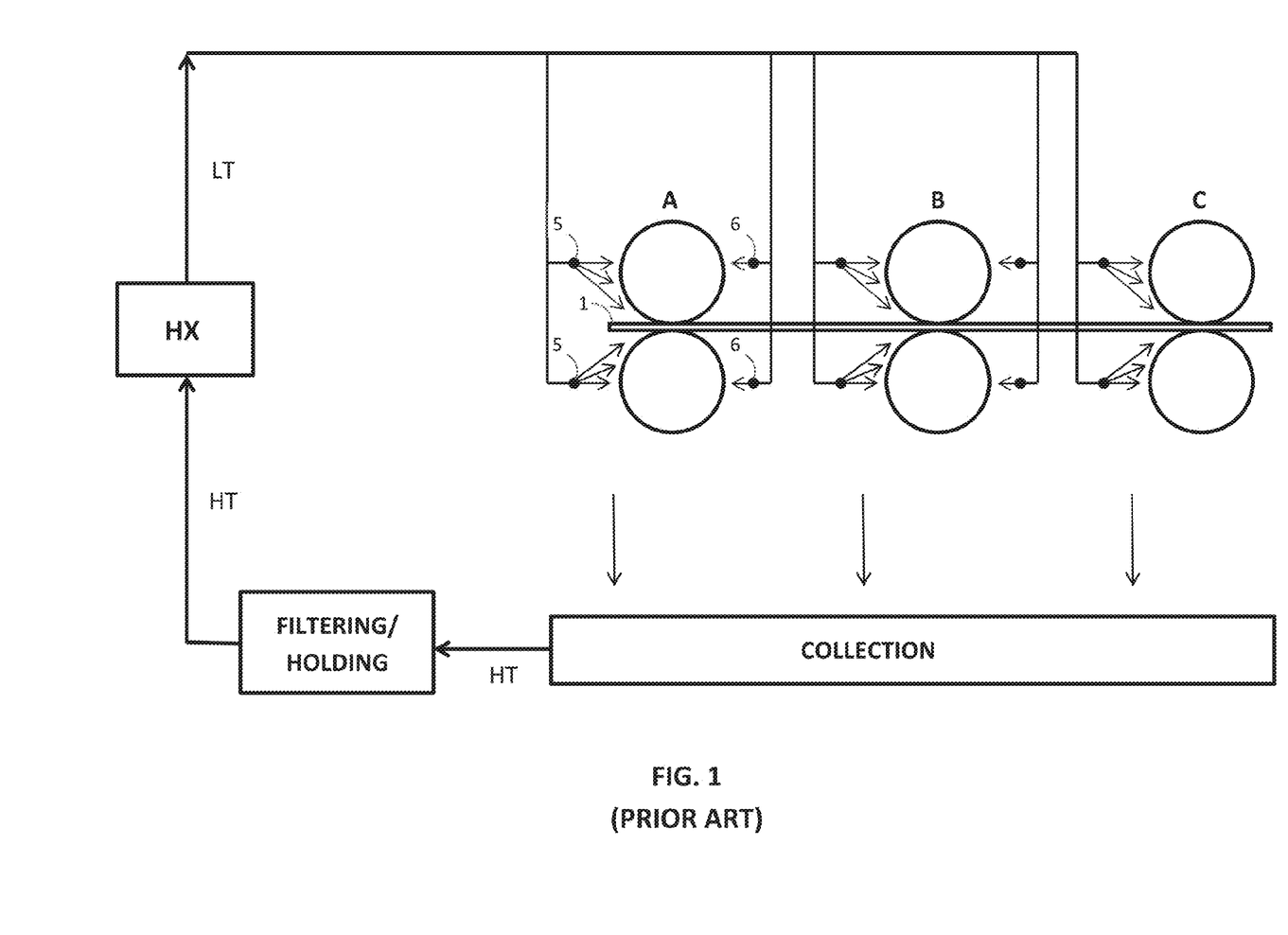
FIG. 1 shows a schematic of a conventional rolling mill and coolant system.

The rolling of metals, such as aluminum, in hot-strip mills is a type of metal forming process that is well known. In a rolling metal forming process, a metal stock is conveyed through a pair of rollers or rolls in one or more roll stacks. Typically, the metal is rolled through multiple stacks of rolls, the sheet of metal reducing in thickness as it passes through each stack and forming a smooth, finished surface and subsequently rolled into a coil. The type of rolling process is classified according to the temperature of the metal rolled. If the metal temperature exceeds its recrystallization temperature during rolling, the process is termed hot rolling; if the temperature remains below the recrystallization temperature, then the process is referred to as cold rolling. In either process, the friction and deformation of the metal during rolling creates significant heat in both the rolled metal sheet and the rolls of each stack. To address problems associated with excess heat, rolling mills include a cooling system that discharges a cooling fluid, such as a water or a water-based emulsion, from various sets of cooling nozzles onto the rolls and rolled sheet metal. Typically, as shown in FIG. 1, a set of cooling and lubrication nozzles 5 is positioned to discharge the cooling fluid on the work roll surface at the entry side of the mill. Roll cooling nozzles 6 at the exit side of the mill may also be available. The cooling system in conventional mills uses a common coolant supply that is pumped to all cooling nozzles 6 and cooling and lubrication nozzles 5 such that the temperatures of the cooling fluid is the same at all discharge nozzles.

FIG. 1 depicts a conventional rolling mill having three roll stacks A, B and C through which a metal slab 1 is rolled to reduce thickness in a hot rolling metal forming process. Because the friction and deformation of the metal during rolling creates significant heat in both the rolled metal sheet and the rolls of each stack, the mill includes a cooling system that discharges a cooling fluid, such as water or an oil-in-water emulsion of lubricant, onto the rolls and rolled metal to transfer heat and prevent overheating of the rolls or metal during the metal forming process. Typically, the cooling system includes a cooling pump (not shown) that pumps a cooling fluid through the various nozzles of the cooling system at each roll stack. The cooling system may include roll cooling and lubrication nozzles 5 on an inlet side of a roll stack that discharge cooling fluid onto the roll surfaces on an upstream side and strip cooling nozzles that discharge the cooling fluid onto the pair of rolls 6 on the downstream side. Similarly situated roll cooling and lubrication nozzles may be used on additional roll stacks downstream as well. Conventional hot aluminum rolling tandem mills are cooled by the means of coolant fluid, often a coolant emulsion, supplied at the same temperature to the rolls of all stands of the rolling mill. After discharge of the coolant at the roll stacks, the coolant, having been heated to an elevated temperature HT, is collected in a collection reservoir then pumped through a filtering/holding system and through a heat exchanger HX that reduces the temperature of the coolant to a lower temperature LT to the roll cooling and lubrication nozzles 5 and strip cooling nozzles 6. In this manner, the coolant can be used and re-used continuously during the metal rolling process. As can be seen by referring to FIG. 1, the coolant at the effluent temperature LT from the heat exchanger HX is common to all cooling discharge nozzles. Typically, the temperature of coolant used is limited to the 55+/−5° C. based on various factors, such as the following. Some alloys require somewhat elevated coolant temperature for rolling in order to produce oil release onto the work rolls. In addition, changing the temperature of the bulk coolant system and responding to the requirements of the product being rolled entails energy input when reheating the emulsion to the temperature needed for alloys that roll better with warmer coolant. Bulk coolant temperature below 50° C. is generally undesirable because of the increase of the risks related to workers' exposure and, in some mills, mill coolant temperature reduction is limited by the flow capacity and temperature of the cooling water.

One drawback associated with using coolant within this temperature range is that the rolled sheet metal temperature may exceed a temperature required for metallurgical reasons or, in order to avoid exceeding this temperature, the rolling speed would have to be reduced. This can limit the speed at which the rolled sheet metal can be coiled after the rolling process. It would be desirable to provide a cooling system that further cools the rolled sheet metal at one or more locations, while maintaining a bulk coolant temperature at remaining cooling and lubrication locations during the rolling process. It would be further desirable if such a cooling system could allow for control over the targeted cooling temperatures and if such improvements could be used with conventional mills having a cooling system that collects the discharged coolant within a common stream.

In certain aspects, the present invention provides a cooling system that cools the rolled sheet metal during rolling at one location with coolant fluid at a first temperature at or above 50° C. and cools the rolled sheet metal at another location with coolant fluid at a second temperature below 50° C. so as to allow increased rolling speed. This allows the cooling system to retain the advantages of coolant discharge about 50° C. during much of the rolling process, while a coolant flow below 50° C. at select locations allows for increased rolling or coiling speed and improved efficiency. The different temperature coolant flows can be generated from a single coolant supply collected from the discharged heated coolant using a dual temperature heat exchanger system, for example a heat exchanger system comprising at least two heat exchangers, the first heat exchanger cooling a first portion of the heated discharged coolant fluid to about the first temperature and the second heat exchanger cooling a second portion of the heated discharged coolant fluid to the second lower temperature suitable for use in the lower temperature coolant stream.

In certain aspects, the cooling system includes a piping system having one or more valves to allow conversion of the usually-present stand-by heat exchangers to include a second heat exchanger to provide the colder temperature coolant stream. In many applications, particularly in aluminum hot rolling and coiling, it is advantageous if the first temperature is about 55° C. and the second temperature is about 5 to 15° C. lower than the first temperature, such as about 40° C. This allows the cooling system to retain the advantages associated with the higher temperature coolant stream during rolling, while providing additional cooling in select locations, as desired for various purposes, such as to improve rolling or coiling speed. This feature is advantageous over conventional cooling systems as it allows the temperature of the second lower temperature coolant stream to be controlled independently from the bulk temperature in the first coolant stream, as needed for a particular process or application.

As compared to the cooling systems in conventional mills, targeted cooling in accordance with the present invention allows for a significant increase in rolling speed by allowing efficient heat extraction directly from the strip at select locations. This feature also allows for operation without interfering with the lubricating spray temperature (at mill entry), thereby providing optimum lubrication and adjustment of the mill cooling rate to the product rolled without additional energy input for reheating the coolant. In addition, targeted cooling allows operation with a sufficiently high bulk coolant temperature to avoid workers' exposure and without requiring additional demand for cooling water.

In one aspect, targeted cooling utilizes a targeted supply of mill coolant at a reduced temperature supplied to a coolant spray header 7 at the selected roll stand. The coolant spray header 7 may be a designated cold temperature coolant spray or may utilize any spray nozzles of the system selected by use of one or more valves 8. The targeted coolant stream is at least 5 to 15° C. degrees below the bulk coolant temperature. The "bulk coolant" is defined here as the coolant present in the tanks and applied through a majority of the spray headers of that mill. The targeted "cold" coolant spray header is aimed at one or more select locations as desired. In certain embodiments, the targeted "cold" coolant spray header(s) are aimed at a single mill stand or zone of the multi-stand tandem mill, as desired, so as to produce a significant cooling where can have a greater effect. In another aspect, the targeted "cold" coolant spray header can also be placed in such a way to form a "cold" coolant pool on the slab in the interstand area of the mill, which is especially advantageous as this further increases the removal rate of thermal energy from the rolled slab and hence allows faster rolling speeds while maintaining the required rolling or coiling temperature.

Certain aspects of the invention provide a rolling mill having multiple roll stands, a first coolant stream feeding a first set of cooling nozzles near an upstream roll stand and a second coolant stream feeding a second set of cooling nozzles near a downstream roll stand, the first coolant stream being at a bulk coolant temperature (first temperature) and the second coolant stream being at a "cold" coolant temperature (second temperature) that is lower than the bulk coolant temperature, the second temperature typically being about 5 to 15° C. colder than the bulk coolant temperature. Each set of cooling nozzles may include a set or subsets of nozzles, such as a top set of cooling nozzles and a bottom set of cooling nozzles targeting the coolant to the roll surface on the top and bottom sides, respectively. In certain embodiments, the first and second coolant streams are concurrently discharged by the first and second coolant streams and the discharged coolant is collected in a common fluid stream from which the first and second coolant streams are formed by a piping system.

Figure 2:
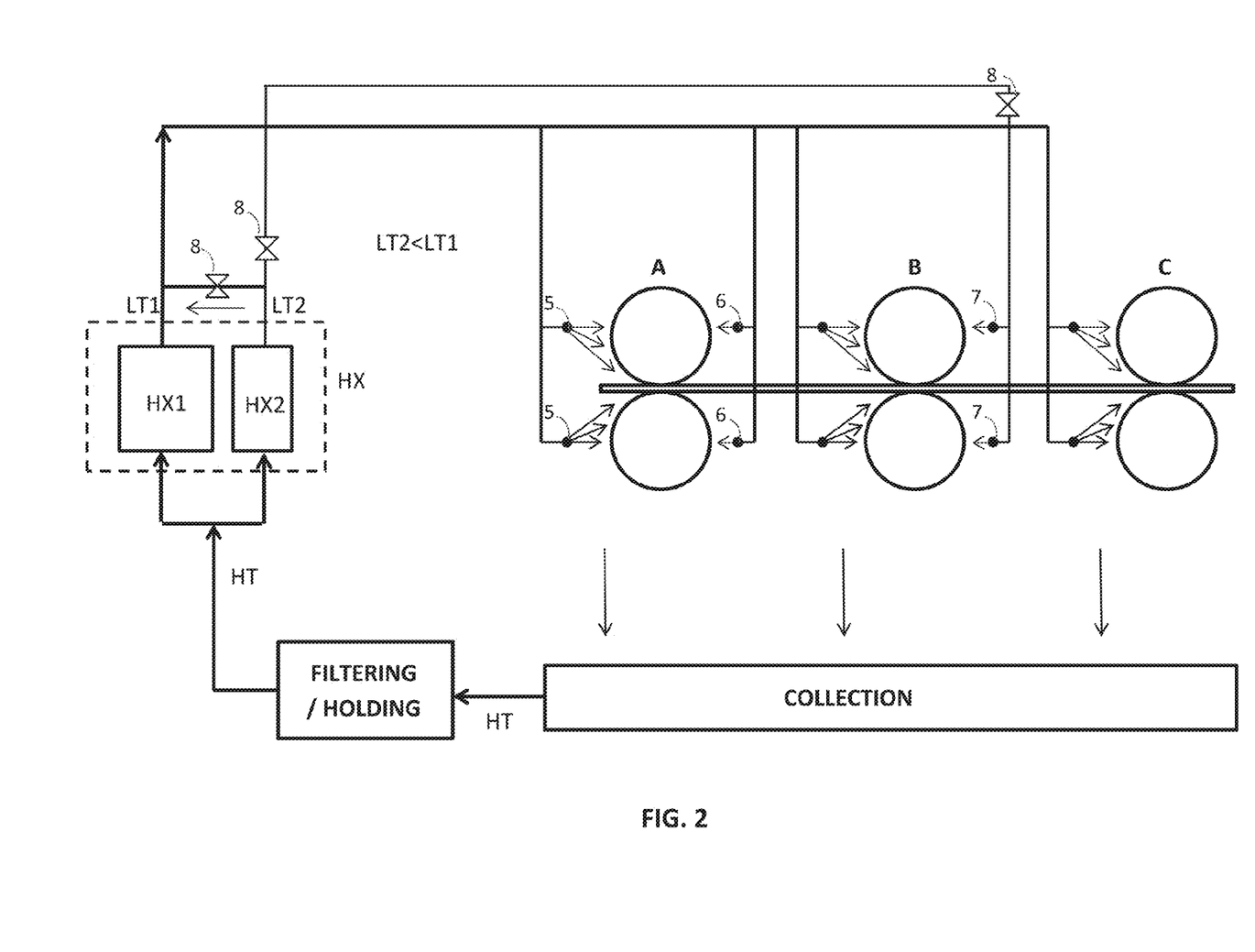
FIGS. 2-3 show a schematic of a rolling mill and cooling system in accordance with aspects of the present invention.

FIG. 2 schematically illustrates a rolling mill with a cooling system in accordance with embodiments of the invention. The heat exchanger system HX includes a first heat exchanger HX1 and a second heat exchanger HX2, the second heat exchanger being adapted to provide a greater reduction in temperature than the first heat exchanger. Upon exiting the heat exchanger system, the cooled coolant water forms a first coolant stream slightly below the bulk coolant temperature LT1 and a second coolant stream at a colder temperature LT2 using the colder coolant fluid from the HX2. Calculations and modeling indicate that cooling a relatively small portion of the total volumetric coolant flow, such as about 5 to 20%, allows for a reduction in temperature of the second coolant stream by about 5 to 15° C. as compared to the bulk temperature LT1 of the first "bulk" coolant stream. An unexpected advantage of the targeted cooling technology described herein is that cooling of just a small fraction, such as about 5 to 20%, of the mill coolant supply, if applied in the right place, can produce a cooling effect that allows a mill speed increase of approximately 75% of that which would result if 100% of the coolant stream were cooled, based on thermodynamic modeling. Thus, by limiting the amount of coolant cooled and targeting its application, about 75% of the effect seen when using a lower coolant temperature in the entire coolant stream can be obtained for significantly less cooling effort.

Figure 3:
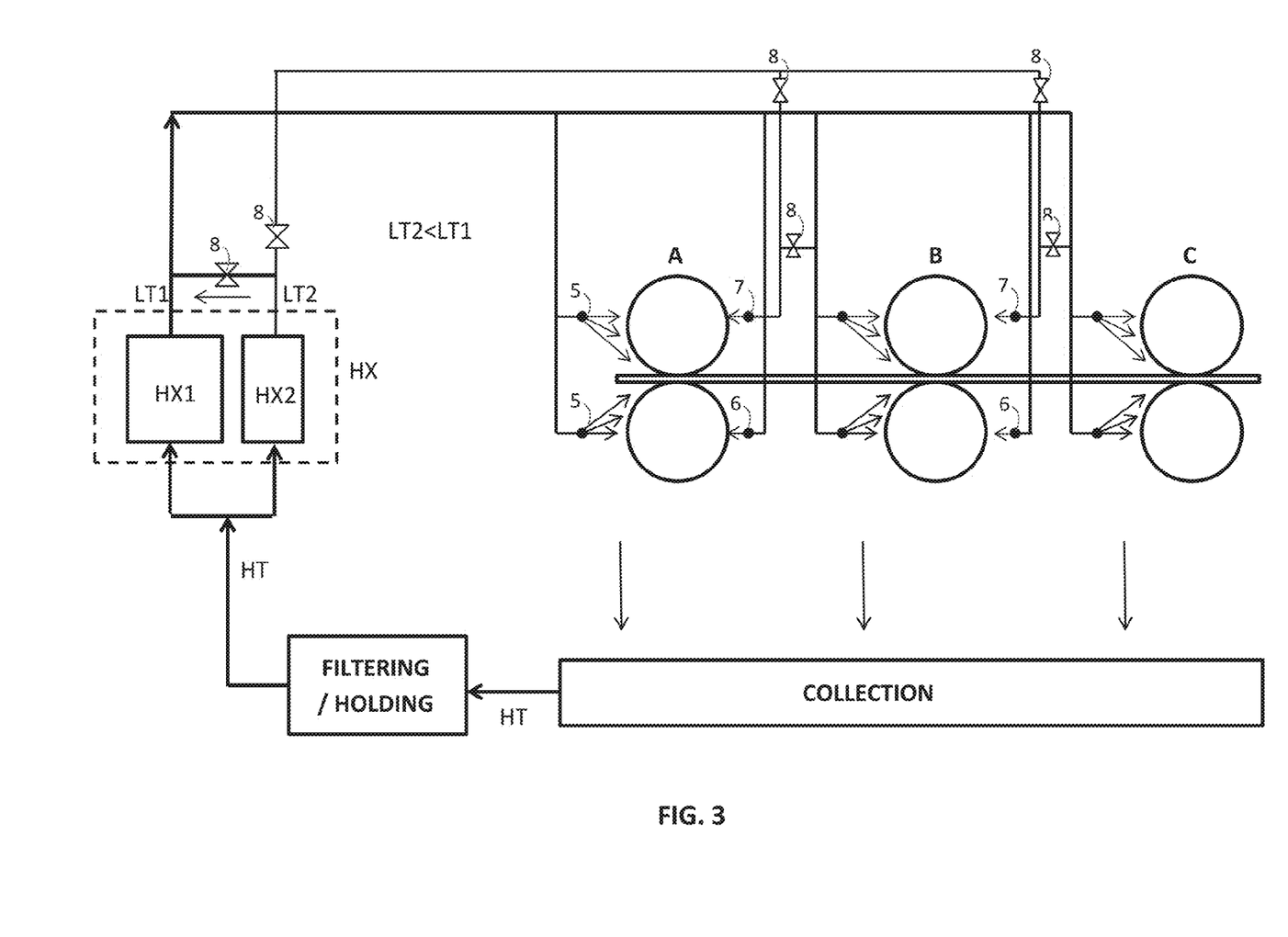

In one aspect, one or more valves 8 in proximity to the heat exchanger may be used to control coolant flow through the second heat exchanger HX2, thereby controlling the temperature of the "cold" coolant flow, and may further be used to adjust a temperature of the bulk flow by controlling flow of the "cold" coolant flow into the bulk coolant flow. In another aspect, one or more valves in closer proximity to the cooling nozzles may be used to selectively control flow of the "cold" coolant flow to one or more sets of nozzles as needed to provide any of the targeted cooling aspects described herein. Example embodiments of these aspects are shown in FIGS. 2 and 3, but various other configurations may be used in accordance with these aspects of the invention.

In another aspect, the targeted "cold" mill coolant (coolant stream at the second lower temperature) is supplied in such a way to produce a "cold" pool of coolant on the slab at the interstand between the two last mill stands. This can be accomplished by targeting the "cold" coolant at all spray headers of a second roll stand downstream of the first roll stand exit side headers of the first roll stand and/or the entry headers on the third roll stand and exit side headers of the second stand, or preferably, at very minimum, by targeting just the top exit cooling header of Stand B or C. As shown in FIG. 3, the targeted colder mill coolant (T=40° C.) is supplied to the selected top exit mill headers of the selected roll stack(s), while the coolant at the nominal temperature (T=55° C.) is supplied to the remaining headers feeding the entry cooling nozzles and bottom exit nozzles. Once discharged by the cooling nozzles, the coolant cools the heated rolled metal, which in turn heats the discharged coolant, which is then collected in a sump tank. The collected heated coolant is then pumped into one or more skim tanks before being filtered and then held in one or more holding tanks (e.g. clean tank holding filtered water) before being pumped into the heat exchanger system HX. Hot mill coolant is pumped from the coolant tank and sent through the dedicated heat exchanger to the target cooling spray headers. In the embodiments shown, the discharged coolant flow is collected and pumped within a common flow path before being pumped into the heat exchanger and divided into first and second portions within the first and second heat exchangers, respectively. The size and operating conditions of the dedicated heat exchanger are selected in such a way to allow the temperature of the exiting cold stream of coolant to be at least 5 to 15° C. degrees lower than the temperature of the bulk coolant pumped through other headers of this mill. The location and type of the nozzles and the coolant flow rate through this targeted interstand cooling header is selected in such a way so as to maximize the heat extraction from the sheet at the interstand area by means of creating a coolant pool between the sprayed rolls and the next set of rolls downstream.

In certain embodiments, a number of sets of cooling nozzles in the mill is between one and the total number of roll stands in the mill minus one. Typically, the sets of cooling nozzles are directed to the top work rolls of each stand. These sets of cooling nozzles can be used in addition to the standard cooling/lubrication sets of nozzles discharging coolant to the entry side of the top and bottom work rolls and to the exit side of the bottom work rolls of each roll stand.

In one aspect, the headers selected for targeted cooling are those that have a greater chance of creating a pool of coolant. These headers might, for example, be located at the exit side of the upper roll of one of the intermediate rolls of the tandem mill or at the entry side to the final stand. Either existing mill headers or additional dedicated headers could be used for this purpose. Dedicated headers may be advantageous on mills which do not have existing exit-side headers.

Figure 4A:
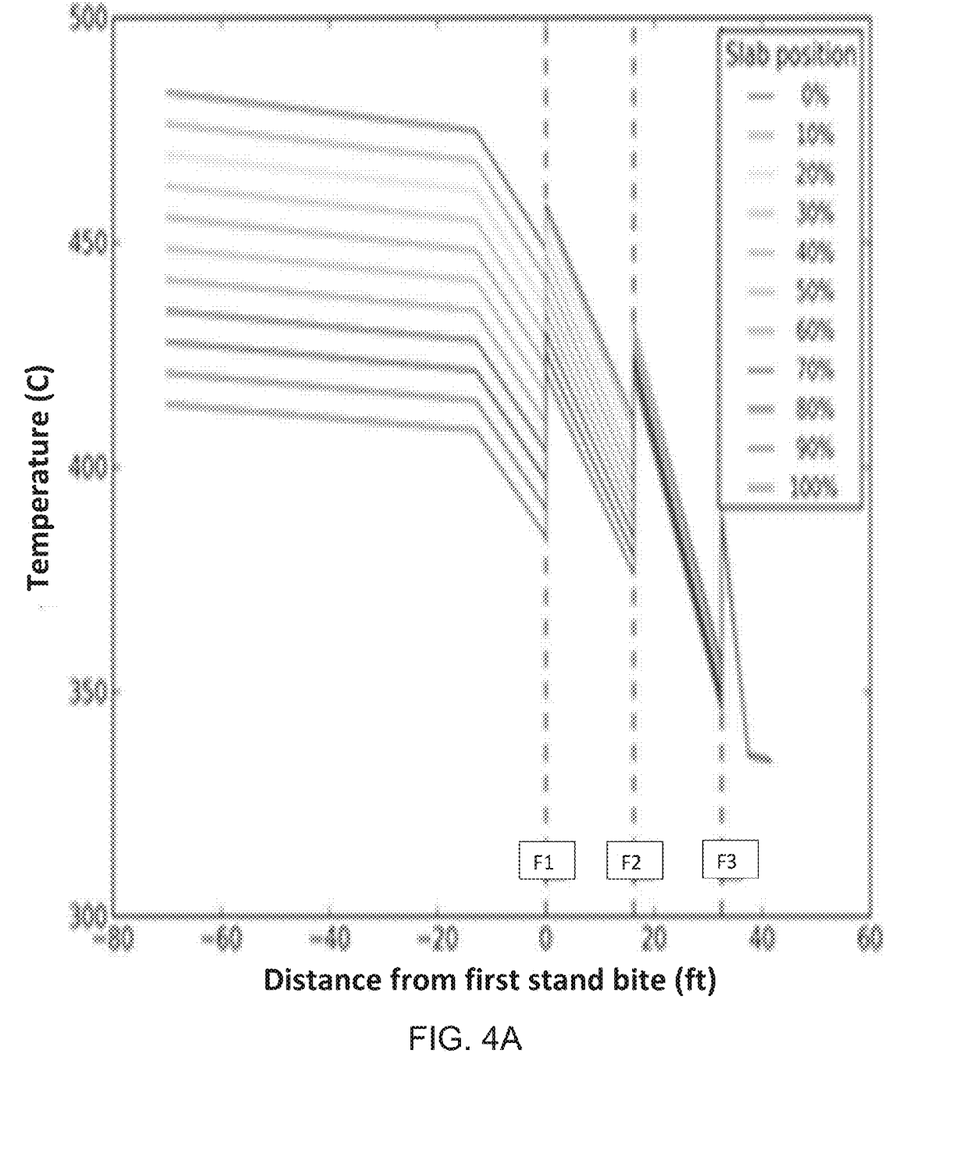
FIGS. 4A-4B graphically depicts slab temperatures of products run through a rolling mill.
Figure 4B:
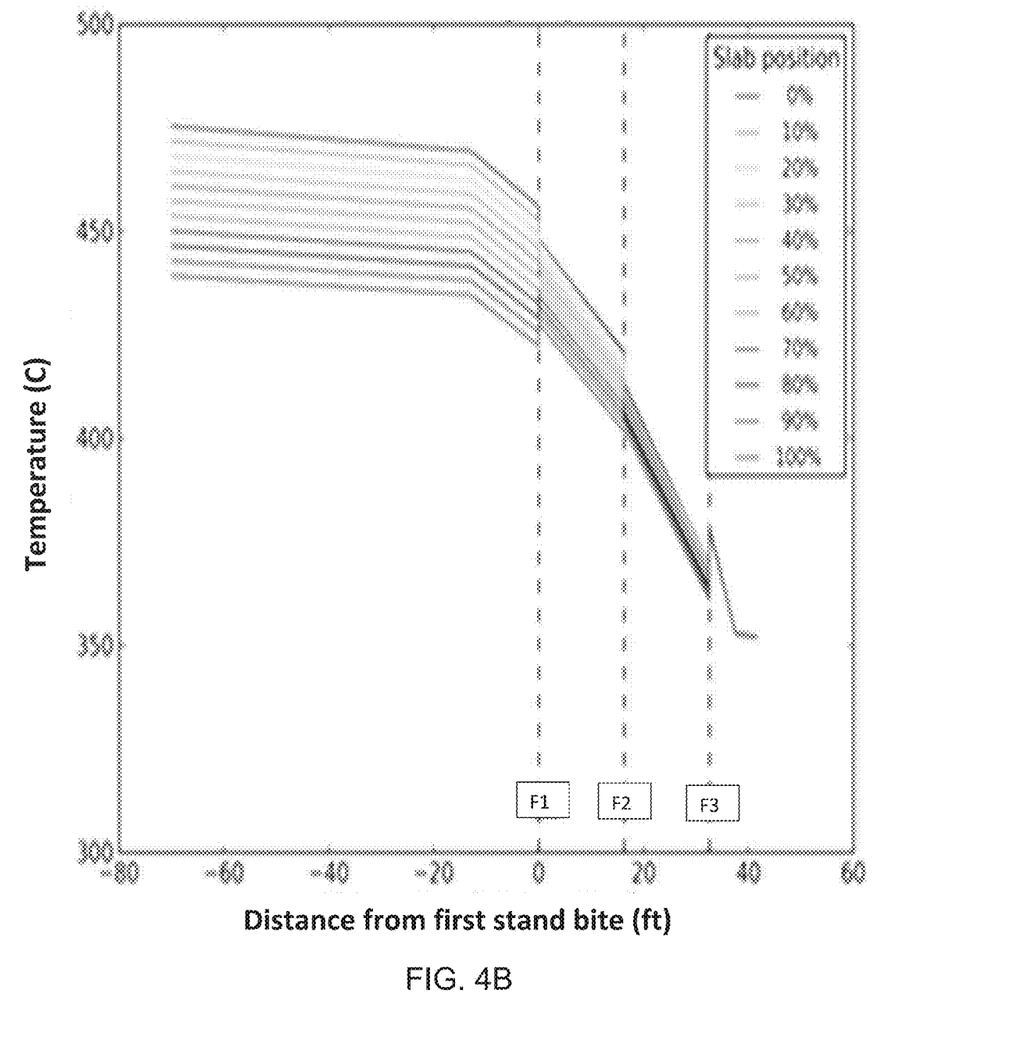

FIGS. 4A-4B depict rolling model predictions of two products showing temperature along the length of the mill versus temperature during rolling of each product. FIG. 4A depicts rolling of CES (can end stock) Aluminum, Product 1 (5182, 0.095" thick×66.7" wide) and CBS (can body stock) Aluminum, Product 4 (3104-01, 0.110" thick×61.0" wide). In each of FIGS. 4A and 4B, the dashed lines F1, F2 and F3 represent locations at Stack 1, Stack 2 and Stack 3, respectively. The presence of a coolant pool on the slab between stands, as noted above, is particularly advantageous given its effect on slab cooling at the interstand area. As shown in the rolling model predictions illustrated in FIGS. 4A-4B, greater slab temperature decreases are indicated in the areas covered by lubricant pools, especially at the interstand area 2-3 between Stack 2 and Stack 3 (between dashed lines F2 and F3 in each of FIGS. 4A and 4B) than in the areas of direct contact with the work rolls. An additional advantage of this feature is that most of the mill and coolant system, and particularly conditions at the bite entry with an exit spray header used for cooling, are left largely unchanged from current practice. These prediction models use the following flow rates per roll in GPM/inch width, first stand to last for the rolls: in FIG. 4A, Entry side: [6.0, 4.0, 4.0]/Exit side: [4.0, 4.0, 6.0], and in FIG. 4B, Entry side: [9.0, 9.0, 9.0]/Exit side: [9.0, 9.0, 6.0] and succeeds in matching the roll temperature to that observed in conventional plants. Flow meters may be used to measure coolant flow rate delivered to each nozzle or the coolant flow rates can be calculated based on the spray pattern used to roll a specific product, coolant pressure and nozzle capacity information. Calculated coolant flow rates and coolant flow rates used in the model of rolling of Product 1 are shown below in Tables 1A-1B, respectively. Cooling of 7 to 10% of the total mill coolant flow would have a desirable effect on the rolling speed, based either on the flow rates used in the model or on the calculated flow rates. It is appreciated that targeting "cold" coolant at other different areas of the mill may provide additional benefits, depending on the additional coolant flow rates available.

TABLE 1A

Calculated Coolant Flow Rates for Product 1

| Header Location | Coolant Flow Flow Rate [GPM] | Fraction cooled if 2 sides | if top |
|---|---|---|---|
| F1 Entry | 731 | | |
| F1 Delivery | 1,109 | | |
| F2 Entry | 1,109 | | |
| F2 Delivery | 1,109 | 19% | 10% |
| F3 Entry | 1,109 | | |
| F3 Delivery | 545 | | |
| TOTAL | 5,712 | | |

TABLE 1B

Flow Rates Used in the Model for Product 1 Simulation

| Header Location | Coolant Flow Rate per Roll [GPM/"] | per Stand [GPM] | Fraction Cooled if 2 sides | if top |
|---|---|---|---|---|
| F1 Entry | 6 | 800 | | |
| F1 Delivery | 4 | 534 | | |
| F2 Entry | 4 | 534 | | |
| F2 Delivery | 4 | 534 | 14% | 7% |
| F3 Entry | 4 | 534 | | |
| F3 Delivery | 6 | 800 | | |
| TOTAL | 28 | 3,735 | | |

Figure 5:
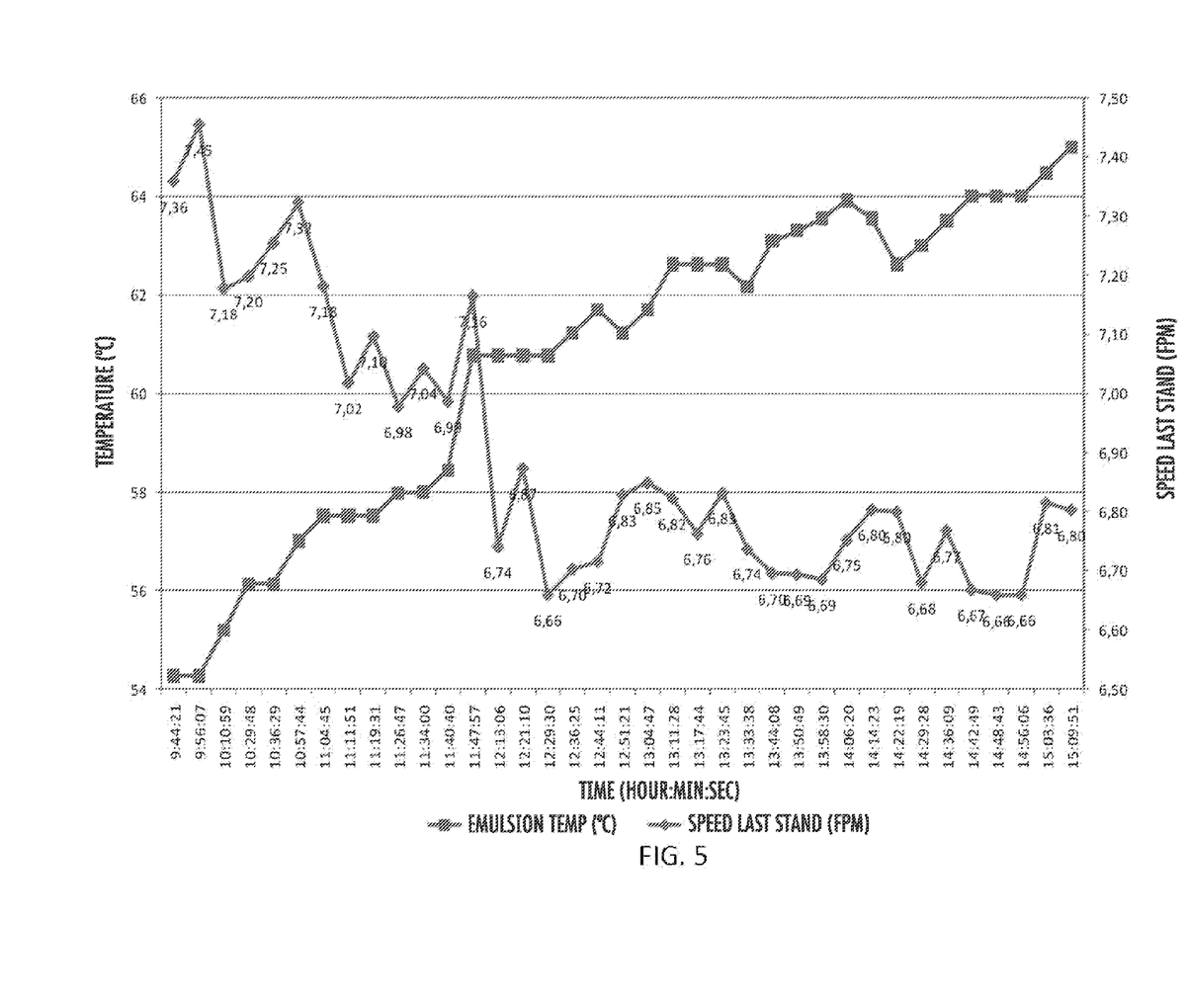
FIG. 5 graphically depicts rolling speeds of the last stand in a multiple stand rolling mill versus coolant temperature during hot rolling.
Figure 6:
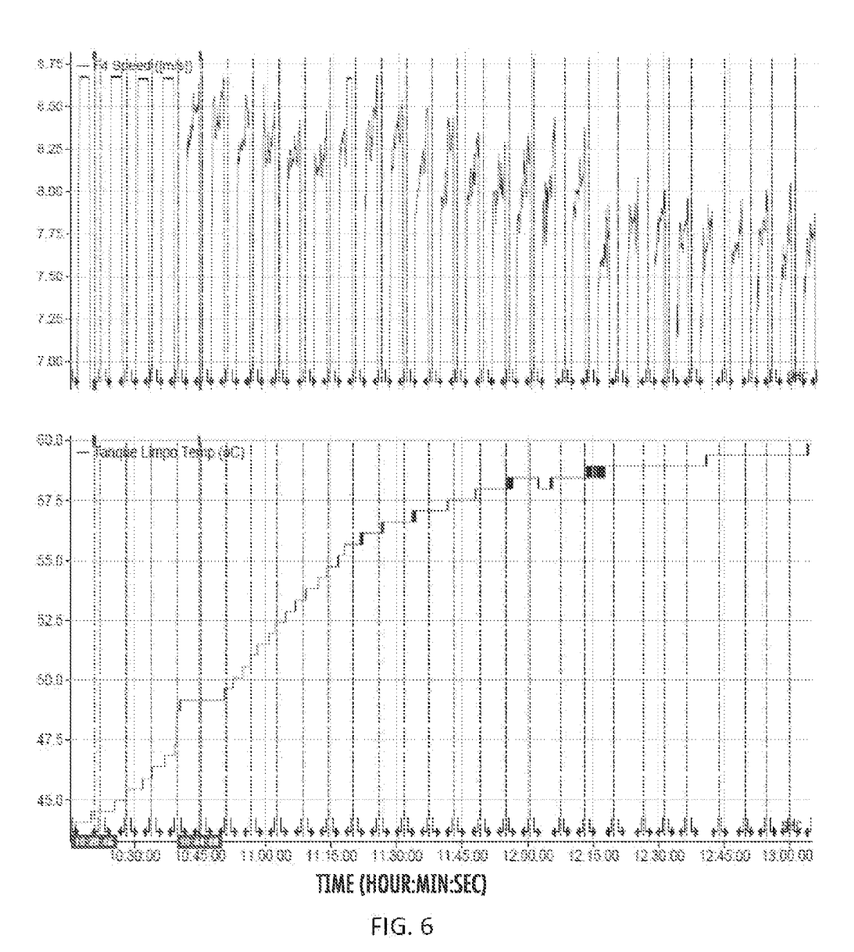
FIG. 6 graphically compares rolling speeds versus coolant temperature in an example rolling.

In one aspect, the relationship between the coolant temperature and the rolling speed can be established empirically. For example, operational data obtained from rolling of CBS, indicates an increase of rolling speed of about 10% with a reduction in coolant temperature of about 5° C. This data is illustrated in FIG. 5, which shows rolling speeds in feet per minute (FPM) versus coolant temperature during rolling. In addition, recorded data indicated a 5% increase in rolling speed of CBS is associated with a reduction in coolant temperature of about 10° C. This data in FIG. 6, which shows rolling speeds, shown in the upper graph, versus coolant temperature, shown in the lower graph, suggests that a 10° C. decrease in the mill coolant temperature in some rolling processes can provide a mill speed increase exceeding 10%.

The rolling model predictions shown in these figures indicate a similar trend. Moreover it suggests that only a small part of the total mill coolant flow stream need be cooled down in order to produce a desirable effect. FIGS. 7A-7D illustrate rolling speed as a function of coolant temperature on a three stand tandem mill during rolling of two different products.

Figure 7A:
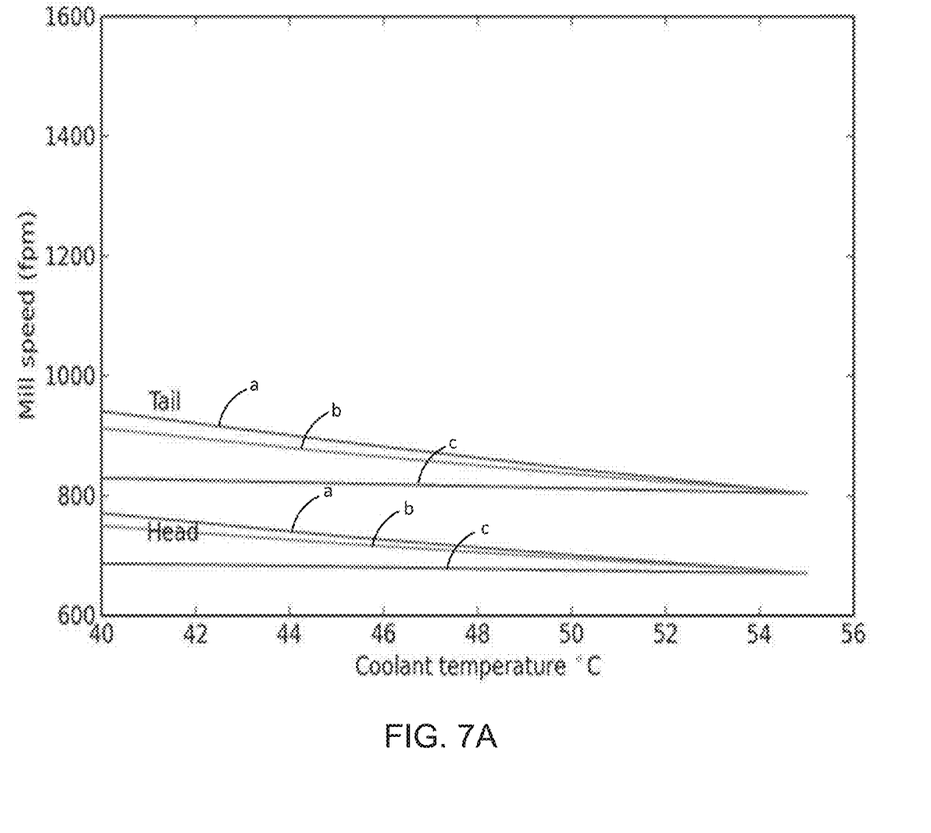
FIGS. 7A-7D graphically depict rolling speeds versus coolant temperature of products run through a mill, in accordance with certain aspects of the invention.
Figure 7B:
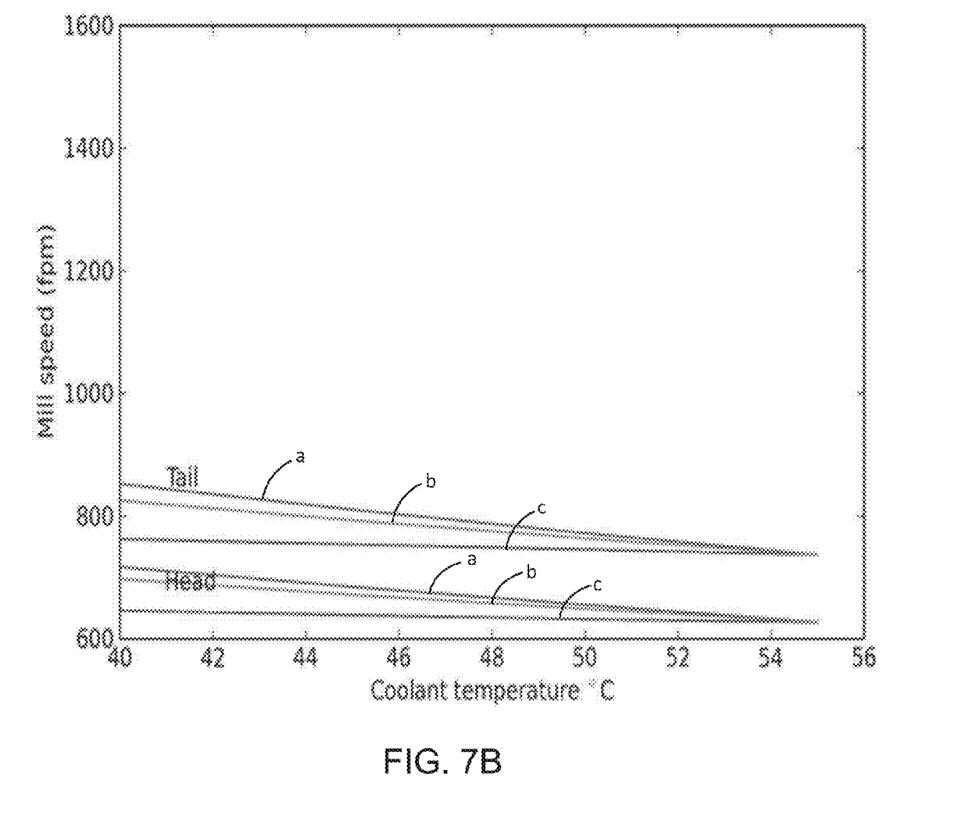
Figure 7C:
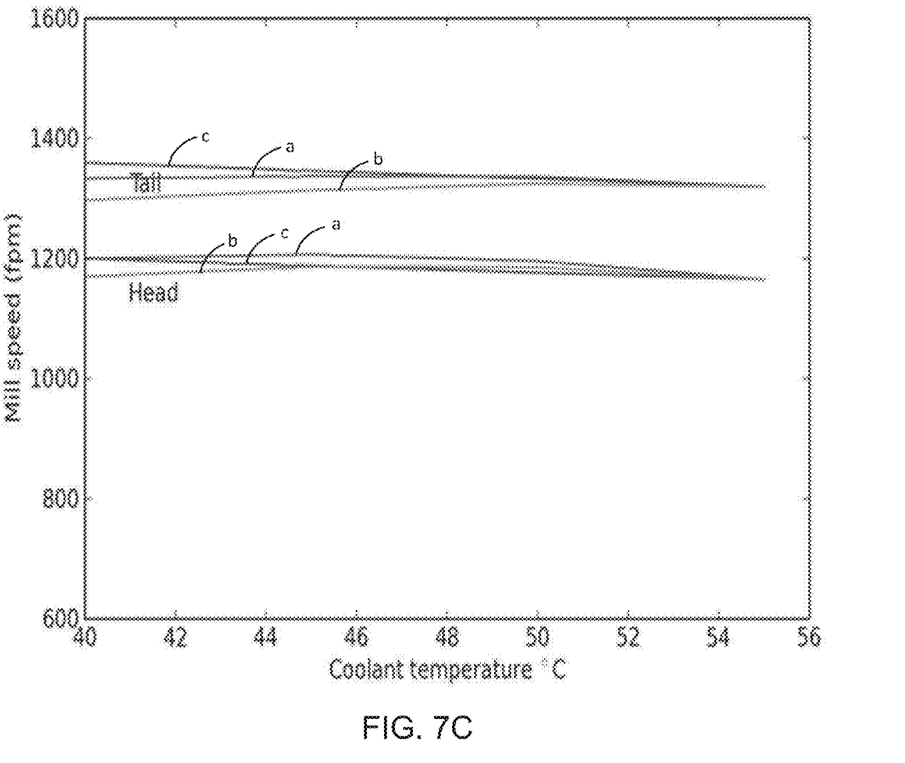
Figure 7D:
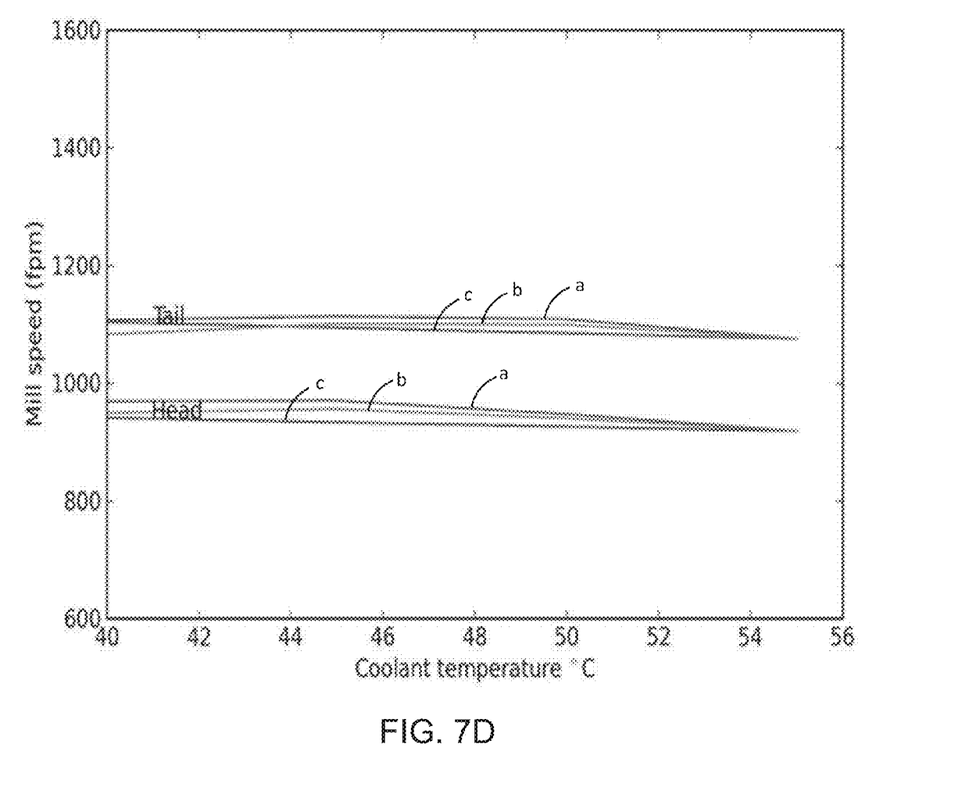

FIGS. 7A and 7B illustrate rolling of two CES samples, Product 1 (5182, 0.095" thick×66.7" wide) and Product 2 (5182, 0.110" thick×66.7" wide), respectively, and FIGS. 7C and 7D illustrate rolling of two CBS samples, Product 3 (3104-03, 0.085" thick×76.7" wide) and Product 4 (3104-01, 0.110" thick×61.0" wide), respectively. Each of FIGS. 7A-7B illustrate the predicted rolling speed versus coolant temperature during rolling of the product from the Tail end to the Head end of the coil of rolled metal. The modeled scenario is a rolling mill having three stacks; Stand 1, Stand 2 and Stand 3. Line a indicates the benchmark condition in which all three stands (Stand 1, Stand 2 and Stand 3) are sprayed with colder coolant at the temperature indicated and pools of coolant are formed in the interstand areas. Line b represents the condition in which the exit sides of Stands 2 and 3 are sprayed with colder coolant, resulting in targeted cooling in the interstand area between Stands 2 and 3. Line c represents the condition in which Stand 3 is sprayed with colder coolant. The temperature of the coolant applied to all the remaining entry and exit sprays is 55° C. Application of colder coolant just onto the exit of a second, downstream stand while rolling Products 1 and 2 is determined to have about 75% of the cooling effect than if the cold coolant was applied to all the stands. Applying the "cold" coolant stream separately to Stand 2 or Stand 3 preserves the nominal temperature of 55° C. of the coolant in the interstand pools.

According to the model, for rolling of both Products 1 and 2, rolling speeds increase by 10.4% and 4.4% when the exit spray coolant temperature at Stand #2 is reduced to 40° C. Surprisingly, in rolling of certain products, such as CBS, roll cooling of the work rolls of Stand 2 or Stand 3 (F2 or F3) allows for more increase in rolling speed than interstand pool cooling. Applying 40° C. coolant to either of these rolls results in an expected increase in rolling speed of 3% to 6%. The difference between the two products relates to lack of forward slip on the last roll stand and the difference in process speeds which limit the predicted speedup for CBS.

In one aspect, the effect of the targeted coolant stream on the bulk coolant temperature may be relatively small even if the temperature differential therebetween is 15° C. In one example, with 20% of the mill coolant flow being directed towards the targeted cooling stream at 40° C., the overall bulk coolant temperature in the mill sump tank would be 57° C. Additional moderate cooling by directing the remaining flow through heat exchangers can be used to bring the bulk coolant temperature to the desired 55° C., as shown in Tables 2 and 3 below. Because the bulk coolant temperature target is unchanged (55° C.) and only the points of heat extraction are changed, the net amount of heat extracted from the coolant would be approximately the same as that needed under normal operation of the coolant system.

TABLE 2

Expected Sump Coolant Temperatures in Various Cooling Modes

| Coolant Delivery Headers | Relative Coolant Flow | Coolant Mill Entry T | Partial Coolant Sump T | Coolant Sump T | Action Required to Bring Bulk Coolant Back to 55° C. |
|---|---|---|---|---|---|
| bulk supply at nominal T | 100 | 55 | 60 | 60 | cooling 20-30 k LPM coolant flow by 5° C. through mill coolant flow through heat exchangers |
| bulk supply at reduced T | 100 | 40 | 45 | 45 | 1/cooling 20-30 k LPM coolant flow by 15° C. 2/heating 450-630 K liters of coolant by 10° C. |

TABLE 2-continued

Expected Sump Coolant Temperatures in Various Cooling Modes

| Coolant Delivery Headers | Relative Coolant Flow | Coolant Mill Entry T | Partial Coolant Sump T | Coolant Sump T | Action Required to Bring Bulk Coolant Back to 55° C. |
|---|---|---|---|---|---|
| bulk supply at nominal T | 90 | 55 | 60 | 54 | cooling 450-630 K liters of coolant by 3.5° C., through mill flow through heat exchangers |
| targeted | 10 | 40 | 45 | 4.5 | cooling target stream 2-3 K LPM by 15° C. |
| | | | | 58.5 | |
| bulk supply at nominal T | 80 | 55 | 60 | 48 | cooling 450-630 K liters of coolant by 2° C., through mill mill flow through heat exchangers |
| targeted | 20 | 40 | 45 | 9 | cooling target stream 4-6 K LPM by 15° C. |
| | | | | 57 | |

TABLE 3

Heat Extraction from the Coolant to the Heat Exchanger Water

| Coolant Delivery Headers | delta T | Coolant Flow kg/min | Relative Heat Extraction on Cooling [kW] |
|---|---|---|---|
| bulk supply at nominal T | 5 | 30,000 | 10,450 |
| bulk supply at reduced T | 15 | 30,000 | 31,350 |
| bulk supply at nominal T | 3.5 | 27,000 | 6,584 |
| targeted coolant stream | 18.5 | 3,000 | 3,867 |
| | | | 10,450 |
| bulk supply at nominal T | 2 | 24,000 | 3,344 |
| targeted coolant stream | 17 | 6,000 | 7,106 |
| | | | 10,450 |

In one aspect, the flow of the bulk coolant stream and "cold" coolant stream exiting the first and second heat exchangers, respectively, is controlled by one or more valves within a piping system coupling the heat exchanger system to the "cold" cooling nozzles (second set of nozzles), such as shown in FIGS. 2 and 3. The valves may be adjustable, by a user or automatically according to a control algorithm, to direct a portion of the coolant to the second heat exchanger for the "cold" coolant supply stream feeding the "cold" cooling nozzles. Detailed calculations of the targeted coolant stream temperature for each plant can be performed based on the capacity and efficiency of their heat exchangers as well as on the entry temperatures and flow rates of cooling water.

In other aspects, the second heat exchanger of the heat exchanger system, which may include one or more heat exchangers, can be adapted to provide a significant reduction in the coolant temperature. Heat exchangers currently available in commercial hot rolling coolant systems are capable of producing a 15° C. cooling effect at moderate reductions of flow rate.

Although the features of the present inventions are discussed within the context of hot rolling of aluminum and particularly with respect to cooling of select locations to facilitate rolling or coiling, it is appreciated that the targeted cooling described herein may be used in a variety of different ways at select other locations during a metal forming process and in various other applications. For example, such targeted cooling may be advantageous in cooling of a mill stand(s) between different products in order to transition the roll stack to the flatness requirement of the new product, possibly cooling the aluminum cold mills, or cooling during rolling of other materials.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

The invention claimed is:

1. A sheet metal rolling apparatus for rolling a sheet metal, said sheet metal rolling apparatus comprising:
   a first roll stand and a second roll stand positioned in series in a conveyance direction along which the sheet metal is conveyed, wherein each of the first and second roll stands includes a pair of rolls through which the sheet metal is rolled in the conveyance direction from an entry side to an exit side of each pair of rolls;
   a first set of cooling nozzles for discharging a cooling fluid to an entry surface of the pair of rolls of one of the first and second roll stands, the first set of cooling nozzles comprising one or more cooling nozzles;
   a second set of cooling nozzles for discharging the cooling fluid to an exit surface of the pair of rolls of one of the first and second roll stands downstream of the first set of cooling nozzles along the conveyance direction, the second set of cooling nozzles comprising one or more cooling nozzles;
   a heat exchanger system that cools the cooling fluid heated by at least one of the pair of rolls after discharge from the first and second set of cooling nozzles sufficiently for subsequent discharge through the first and second set of cooling nozzles, wherein the heat exchanger system comprises:
      a first heat exchanger for transferring heat from the heated cooling fluid to cool the cooling fluid to a first temperature; and
      a second heat exchanger for transferring heat from the heated cooling fluid to cool the cooling fluid to a second temperature lower than the first temperature; and
   a piping system through which the cooling fluid collected after discharge from the first and second sets of cooling nozzles is transported to the heat exchanger system and the first and second set of cooling nozzles, the piping system routed such that cooling fluid exiting the first heat exchanger is discharged by the first set of cooling nozzles and cooling fluid exiting the second heat exchanger is discharged by the second set of cooling nozzles.

2. The sheet metal rolling apparatus of claim 1, wherein the first and second heat exchangers are configured such that the second temperature of the cooling fluid discharged from the second set of cooling nozzles is about 5 to 15 degrees Celsius lower than the first temperature.

3. The sheet metal rolling apparatus of claim 1, wherein the first and second heat exchangers are positioned in parallel along a flow path of the cooling fluid through the piping system.

4. The sheet metal rolling apparatus of claim 1, wherein the piping system is configured such that a larger portion of the discharged cooling fluid passes through the first heat exchanger than the second heat exchanger.

5. The sheet metal rolling apparatus of claim 1, wherein the piping system is configured such that about 5 to 20% of the discharged cooling fluid passes through the second heat exchanger.

6. The sheet metal rolling apparatus of claim 1, wherein each of the first and second heat exchangers comprises one or more heat exchangers.

7. The sheet metal rolling apparatus of claim 4, wherein the piping system is configured such that a first portion of the discharged cooling fluid collected is directed through the first heat exchanger and a second portion of the discharged cooling fluid collected is directed through the second heat exchanger.

8. The sheet metal rolling apparatus of claim 7, wherein the piping system is configured such that:
the first heat exchanger is fluidly coupled with the second set of cooling nozzles through one or more valves, and/or
the second heat exchanger is fluidly coupled with the second set of cooling nozzles through one or more valves.

9. The sheet metal rolling apparatus of claim 8, wherein the one or more valves is configured to allow the cooling fluid exiting the second heat exchanger to flow to a selected set of cooling nozzles, wherein the selected set of cooling nozzles comprises a top set of cooling nozzles.

10. The sheet metal rolling apparatus of claim 1, wherein a number of sets of cooling nozzles is between 1 and a total number of roll stands of the apparatus minus 1.

11. The sheet metal rolling apparatus of claim 1, wherein three sets of first cooling nozzles are directed to the entry side of a top roll surface of each roll stand.

12. The sheet metal rolling apparatus of claim 1, wherein the first and second sets of cooling nozzles are used in addition to a standard set of cooling and lubrication nozzles discharging coolant to the entry side of a top or bottom roll of each roll stand.

13. The sheet metal rolling apparatus of claim 1, wherein:
the second set of cooling nozzles is adapted to discharge the cooling fluid to the first roll stand or the second roll stand in such a way that causes the cooling fluid to pool on the sheet metal between the first roll stand and the second roll stand.

14. The sheet metal rolling apparatus of claim 1, further comprising a third roll stand, wherein:
the second set of cooling nozzles is adapted to discharge the cooling fluid to the second roll stand or the third roll stand in such a way that causes the cooling fluid to pool on the sheet metal between the second roll stand and the third roll stand.

15. A method of sheet metal rolling, said method comprising:
rolling a sheet metal between a pair of rolls of each of a first roll stand and a second roll stand of a rolling mill, the first and second roll stands positioned in series along a conveyance path of the sheet metal;
discharging a cooling fluid at a first temperature from a first set of cooling nozzles during rolling to an entry surface of the pair of rolls of one of the first and second roll stands;
discharging the cooling fluid at a second temperature from a second set of cooling nozzles to an exit surface of the pair of rolls of one of the first and second roll stands during rolling, wherein the second temperature is lower than the first temperature and wherein the second set of cooling nozzles is downstream of the first set of cooling nozzles along the conveyance path;
collecting the cooling fluid discharged from the first and second set of cooling nozzles, the cooling fluid having been heated by the sheet metal during rolling;
cooling a first portion of the collected cooling fluid in a first heat exchanger to the first temperature by pumping the cooling fluid therethrough;
cooling a second portion of the collected cooling fluid in a second heat exchanger to the second temperature by pumping the cooling fluid therethrough; and
pumping the cooling fluid cooled in the first heat exchanger to the first set of cooling nozzles concurrent with the pumping of the cooling fluid cooled in the second heat exchanger to the second set of cooling nozzles.

16. The method of claim 15, wherein the rolling mill comprises one or more additional roll stands and wherein the method further comprises discharging the cooling fluid at the second temperature so that the cooling fluid pools between any two of the roll stands or between all the stands to cool the metal sheet.

17. The method of claim 15, wherein the second temperature is about 5 to 15 degrees Celsius lower than the first temperature.

18. The method of claim 15, wherein the step of cooling the second portion of the collected cooling fluid in the second heat exchanger comprises cooling about 5 to 20% of the collected discharged cooling fluid in the second heat exchanger.

19. The method of claim 15, wherein the cooling fluid is discharged from the first set of cooling nozzles at the first temperature and the cooling fluid at the second temperature is discharged from the second set of cooling nozzles at the second temperature concurrently during a pass of the sheet metal.

20. The method of claim 15, wherein a number of sets of cooling nozzles is between 1 and a total number of roll stands of the rolling mill minus 1.

21. The method of claim 15, wherein the first and second sets of cooling nozzles are used in addition to a standard set of cooling and lubrication nozzles discharging coolant to an entry side of a top or bottom roll of each roll stand.

22. The method of claim 15, wherein:
discharging the cooling fluid at the second temperature comprises spraying the first roll stand or the second roll stand to cause the cooling fluid to pool on the sheet metal between the first roll stand and the second roll stand.

23. The method of claim 15, further comprising a third roll stand, wherein:
discharging the cooling fluid at the second temperature comprises spraying the second roll stand or the third roll stand to cause the cooling fluid to pool on the sheet metal between the second roll stand and the third roll stand.

* * * * *